US00RE36969E

United States Patent [19]

Streiff et al.

[11] E Patent Number: Re. 36,969

[45] Reissued Date of Patent: Nov. 28, 2000

[54] STATIC MIXING ELEMENT HAVING DEFLECTORS AND A MIXING DEVICE

[75] Inventors: Felix Streiff, Winterthur; Markus Fleischli, Zurich, both of Switzerland

[73] Assignee: Sulzer Brothers Limited, Winthertur, Switzerland

[21] Appl. No.: 08/763,173

[22] Filed: Dec. 10, 1996

Related U.S. Patent Documents

Reissue of:

[64] Patent No.: 5,456,533
Issued: Oct. 10, 1995
Appl. No.: 07/921,048
Filed: Jul. 28, 1992

[30] Foreign Application Priority Data

Jul. 30, 1991 [CH] Switzerland ..... 2276/91
Jul. 30, 1991 [CH] Switzerland ..... 2277/91

[51] Int. Cl.[7] ..... B01F 5/04

[52] U.S. Cl. ..... 366/173.1; 366/174.1; 366/337; 366/338; 366/340; 239/432; 239/430

[58] Field of Search ..... 366/101, 107, 366/152.1, 162.1, 167.1, 173.1, 173.2, 174, 177.1, 183.1, 336, 337, 338, 339, 340; 239/419, 432, 498, 509, 510, 511, 512, 520, 521, 430; 261/76, 77; 422/228, 257

[56] References Cited

U.S. PATENT DOCUMENTS

| | | | |
|---|---|---|---|
| 1,496,896 | 6/1924 | Laffoon | 366/337 |
| 1,598,352 | 8/1926 | Kehoe, Jr. et al. | 239/498 |
| 1,901,954 | 3/1933 | Fruth | 239/498 |
| 3,494,712 | 2/1970 | Vosper et al. | 239/432 |
| 3,734,111 | 5/1973 | McClintock | 366/174 |
| 3,942,765 | 3/1976 | Henrickson | 366/336 |
| 4,208,136 | 6/1980 | King | 360/338 |
| 4,220,416 | 9/1980 | Brauner et al. | 366/337 |
| 4,255,124 | 3/1981 | Baranowski, Jr. | 366/338 |
| 4,296,779 | 10/1981 | Smick | 366/337 |
| 4,414,184 | 11/1983 | Pinkston | 366/336 |
| 4,497,752 | 2/1985 | Huber | 366/337 |
| 4,498,786 | 2/1985 | Ruscheweyh | 366/336 |
| 4,564,298 | 1/1986 | Gritters et al. | 366/167 |
| 4,573,803 | 3/1986 | Gritters | 366/173.2 |
| 4,633,909 | 1/1987 | Louboutin et al. | 366/174 |
| 4,643,670 | 2/1987 | Edwards et al. | 239/498 |
| 4,753,535 | 6/1988 | King | 366/167 |
| 4,812,049 | 3/1989 | McCall | 261/76 |
| 4,981,368 | 1/1991 | Smith | 366/337 |
| 5,173,007 | 12/1992 | Krajieck | 366/173 |

FOREIGN PATENT DOCUMENTS

| | | | |
|---|---|---|---|
| 0063729 | 11/1982 | European Pat. Off. . | |
| 2311578 | 12/1976 | France . | |
| 2349424 | 11/1977 | France . | |
| 2412454 | 7/1975 | Germany . | |
| 3330061 | 2/1985 | Germany . | |
| 8708201 | 12/1987 | Germany . | |
| 581493 | 11/1976 | Switzerland . | |
| 1315392 | 6/1987 | U.S.S.R. | 261/76 |
| 1368348 | 1/1988 | U.S.S.R. | 366/167 |
| 1498545 | 8/1989 | U.S.S.R. | 366/340 |
| 1604444 | 11/1990 | U.S.S.R. | 366/174 |
| 798983 | 7/1958 | United Kingdom | 366/174 |
| WO90/0092 | 2/1990 | WIPO | 366/174 |

*Primary Examiner*—Tony G. Soohoo
*Attorney, Agent, or Firm*—Townsend and Townsend and Crew LLP

[57] ABSTRACT

The static mixing element in a flow channel (7) has at least two deflectors (30) disposed on mountings (20) at a distance from the channel wall. The deflectors form an angle W of from 10° to 45° to the main flow direction Z. They have different orientations and the projection FZ of the deflectors in the main flow direction amounts to from 5% to 50% of the channel cross-section F. Cross-flows providing very efficient transverse mixing are therefore produced in a simple manner. When dispensing tubes (20, 21) are used as mountings a very effective mixing device is provided.

13 Claims, 7 Drawing Sheets

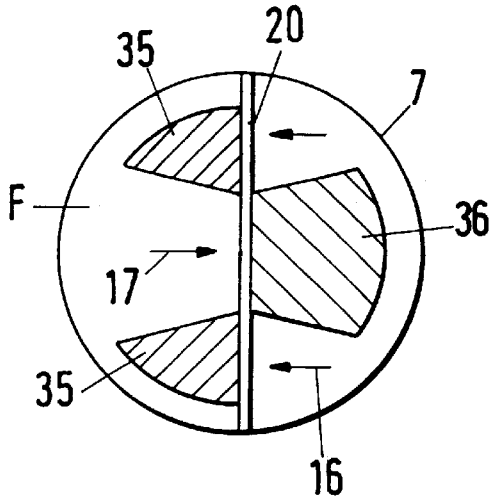
Fig.4a
Fig.4b
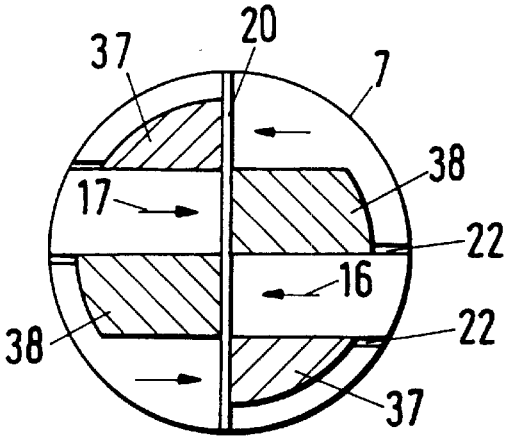
Fig.5
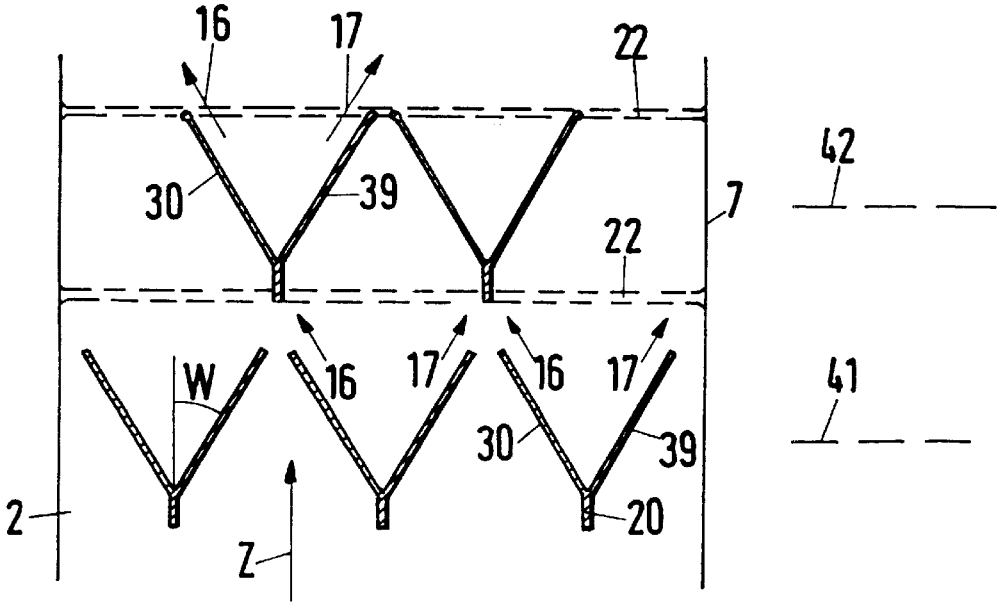

STATIC MIXING ELEMENT HAVING DEFLECTORS AND A MIXING DEVICE

Matter enclosed in heavy brackets [ ] appears in the original patent but forms no part of this reissue specification; matter printed in italics indicates the additions made by reissue.

BACKGROUND OF THE INVENTION

The invention relates to a static mixing element in a flow channel, the element having at least two deflectors, and to a mixing device having such element. Simple static mixing elements having deflectors are known but their mixing and homegenising abilities are very limited and they always produce a relatively high pressure drop. More elaborate static mixers, for example, comprising crossing subchannels of slats (Sulzer-SMV-mixers) provide very good mixing but are relatively costly to produce. Good mixing is particularly necessary when a small quantity of a fluid is injected by means of an injection system into a main flow of another fluid in a flow channel. When relatively small quantities, for example, of less than 10%, of a gas or a liquid are admixed into the flow of another gas or another liquid, very one mixing paths in the empty tube are necessary to ensure thorough homogeneous mixing. However, conventional mixing devices having complicated adjustable injection systems cannot provide thorough mixing over a wide range of loads and more particularly at very low volume flow relationships. For example, in denoxing installations denitrogenation is performed by admixing gaseous ammonia into the flue gas flow in a very low proportion of from 1 : 1000 to 1 : 10 000; very thorough homogeneity is required, with a maximum deviation of less than 5% from the average value, to ensure that in the subsequent catalyst the reaction of NH3 with NOX proceeds very uniformly everywhere, in order to keep within low nox limits and also to ensure that no surplus ammonia breaks through. The stoichiometric mixing ratios must therefore be maintained uniformly and permanently over the whole channel cross-section. Also, this thorough mixing must be achieved over short paths and with a low pressure drop and known mixing devices cannot provide these two features.

It is therefore the object of this invention, using very simple means, to provide very thorough mixing with a relatively low pressure drop and to provide overall advantages as compared with the known kinds of mixer, and it is another object of the invention to provide by means of the static mixing element a simple mixing device which ensures, with a reduced pressure drop and over short paths, high-quality mixing over the entire channel cross-section and over a wide range of load conditions.

SUMMARY OF THE INVENTION

The invention solves these problems by means of a mixing element having deflectors attached to a mounting at a distance from the channel wall. The deflectors form an angle of between 10° and 45° relative to the main flow direction. A projection of the deflectors in the main flow direction amounts to between 5% and 50% of the channel cross-sectional area. Since deflectors are disposed by means of mountings at a distance from the channel wall, the deflectors are flowed around completely at the front and back with very reduced losses, with the result that efficient deflection and eddying are produced in the direction of the angle W. The provision of a few deflectors with different orientations is a very simple means of producing crossing radial subflows with a reduced pressure drop. Because of the deflectors a relatively large turbulence cone is produced in the main flow and deflected in the direction W1. Simultaneously, the dispensing tube injects the fluid for mixing along its axis at the same piece into the deflected turbulence cone. Immediate intensive mixing of the two fluids is therefore produced and the local deflection in the directions W of the at least two oppositely oriented deflectors produces a cross-flow causing intensive mixing over the whole flow channel cross-section. In all, therefore, the device according to the invention produces intensive mixing of the two fluids in the injection zone and good homogenization over the entire channel cross-section by simple means and with a reduced pressure drop. The projection FZ of the deflectors in the main flow direction can be as little as from 5% to 25% of the channel cross-section and therefore lead to optimal mixing with very reduced complexity and a very reduced pressure drop. The deflectors can be rectangular or triangular or trapezoidal or round or bent or curved or cylindrical and even perforate, they can be staggered relatively to one another and, in a substantially uniform distribution, can cover the complete channel cross-section. At least two consecutive mixing elements of this kind can form a mixer arrangement, the elements possibly having deflectors which are offset or turned relatively to one another. A mixing element can be followed by an aftermixing section or path which further enhances mixing.

In particularly effective constructions the deflectors can be at least ten times as large as the outlet cross-section of a dispensing tube and the angle WE with the tube axis can be between 0° and 15°. The devices according to the invention are particularly suitable for mixing ammonia into the flue gas flow of a denitrogenation installation.

The invention will be further described hereinafter with reference to drawings and embodiments.

BRIEF DESCRIPTION OF THE DRAWINGS

FIGS. 4a and 4b show examples in which different deflectors are disposed in round flow channels;

FIG. 5 shows a mixer arrangement in which deflectors are disposed in two cross-sectional planes of the flow channel;

DESCRIPTION OF THE PREFERRED EMBODIMENTS

Figure 1A:
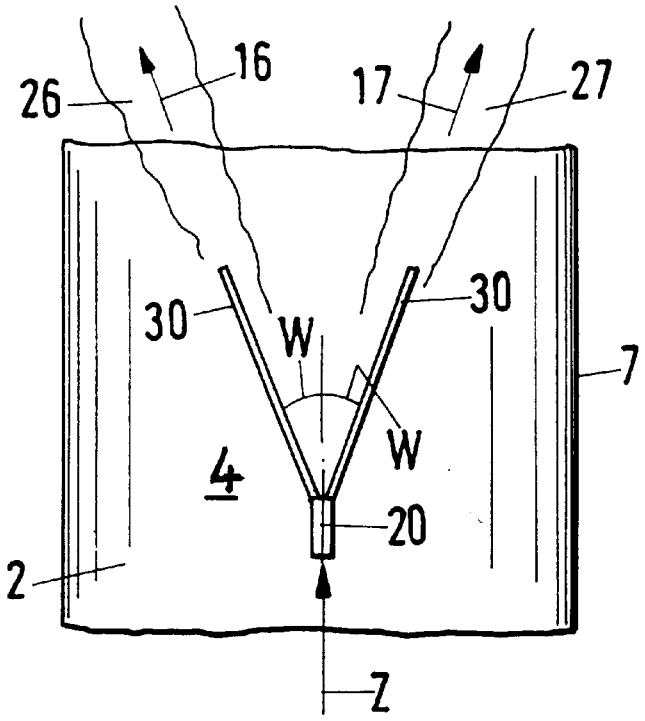
FIGS. 1a and 1b are two views of a mixing element according to the invention which has two deflectors and is on a mounting.
Figure 1B:
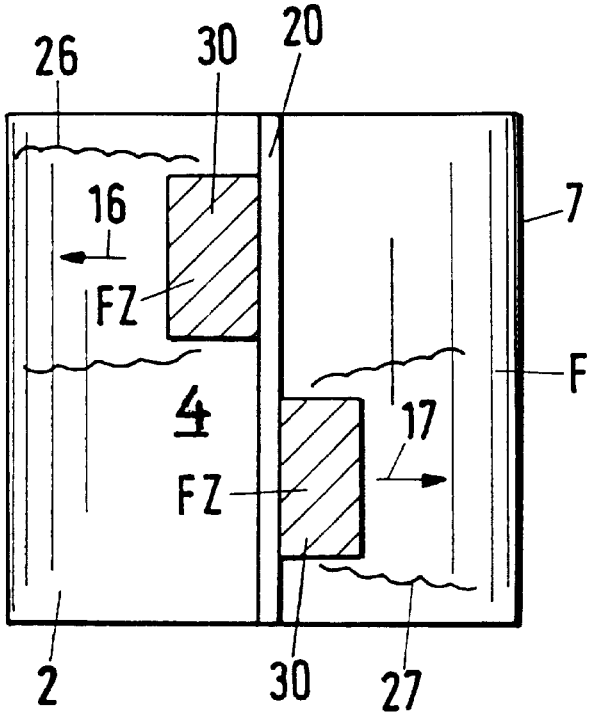

FIG. 1 shows two views of a mixing element 4 according to the invention comprising two deflectors 30 which are secured by way of a mounting 20 in a flow channel 7. The rectangular deflectors 30 are staggered relatively to one another and are each inclined, in opposite orientations to one another, to the main flow direction 8 of the fluid 2 at an angle W of e.g. 30°. The deflectors 30 produce corresponding turbulent flow cones 26, 27 which are deflected in the directions 16, 17 and which cross one another in staggered relationship. The projection FZ of the two deflectors in the flow direction Z amounts to less than 50% of the flow channel cross-sectional area F (see FIG. 1b). A proportion FZ of as little as e.g. from 10% to 20% of F can according to the invention produce turbulent and intensively mixing cross-flows.

Figure 2:
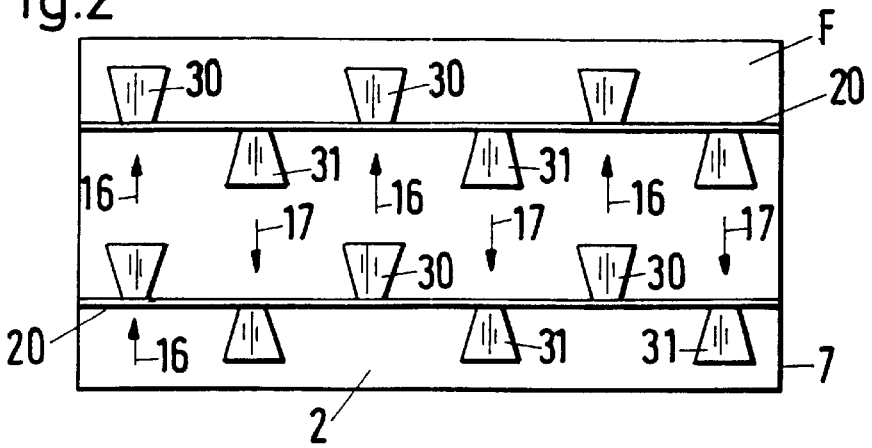
FIG. 2 shows an example having a number of deflectors which cover the channel cross-section F regularly.
Figure 3A:
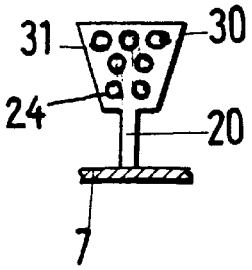
FIGS. 3a to 3d show examples of deflector shapes.
Figure 3B:
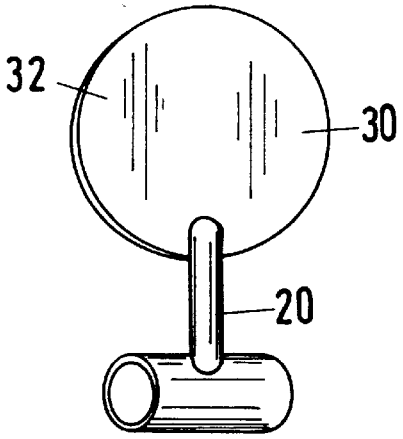
Figure 3C:
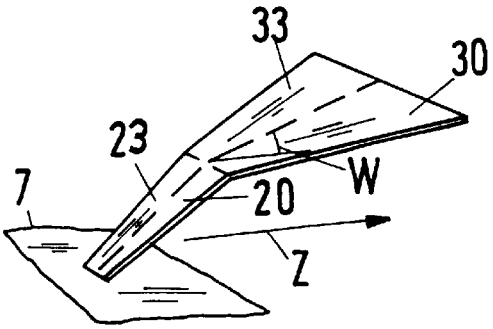
Figure 3D:
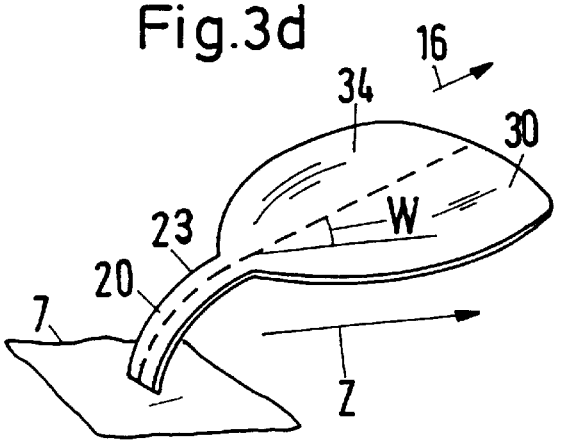

FIG. 2 shows a similar example having a number of deflectors 30 on two mountings 20 to provide regular covering of a complete channel cross-section F with the production of (in FIG. 2) alternately upwardly and downwardly directed subflows 16, 17 of the cross-flows they produce. According to FIGS. 3a to 3d the deflectors 30 can have different shapes and can be, for example, trapezoidal, as 31, or round, as 32, or even perforate, as 24. The mounting is in this case embodied by tubes which have fairly high inherent rigidity. The mounting and deflector can be a unitary device and, for example, as shown in FIG. 3, take the form of a bent stamping 33 which is welded to the channel wall, the narrow prolongation 23 of the wide deflector element 30 serving as mounting. FIG. 3d shows a similar but curved version 34. FIG. 4a shows deflectors of different shapes, for example, in round flow channels, two relatively small deflectors 35 extending to the left and a single central deflector 36 of substantially twice the size extending to the right. FIG. 4b shows a version having two different deflectors 37, 38 in dual form.

The mounting can have reinforcements and stiffenings more particularly for high flow speeds and heavy deflector loadings. The strengthenings and stiffenings can be embodied together with the deflectors as lattice-like or checker-like structures as shown, for example, with the bracings 22 of FIGS. 4b and 5. The mounting can take the form of ropes on which the deflectors are set like sails in the required optimal direction W.

Figure 6A:
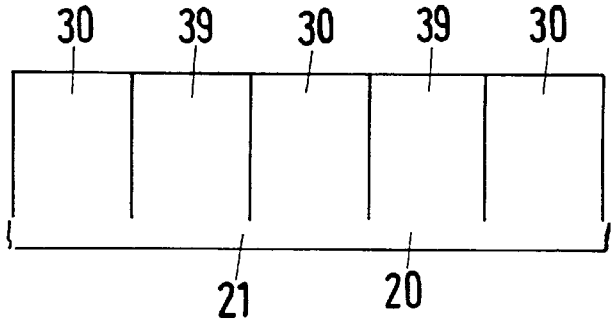
FIGS. 6a and 6b show examples of deflectors with mountings punched from sheet metal strip.
Figure 6B:
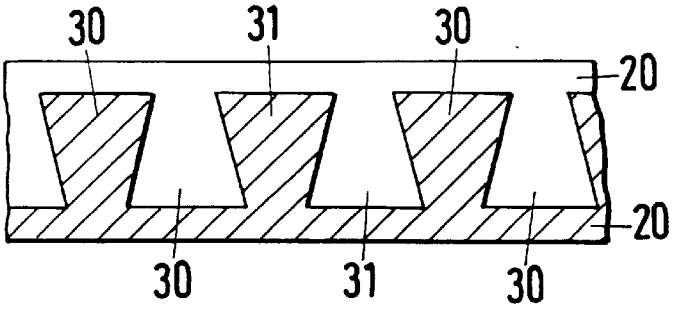

FIG. 5 shows a mixer arrangement having deflectors in two cross-sectional planes 41, 42. The deflectors of plane 42 are staggered relatively to the deflectors of the first plane 41. They can also be turned relatively to one another, for example, by 90°. The arrangement of the deflectors 30, 39 in a single plane corresponds to the illustration of FIG. 2 except that in FIG. 5 larger rectangular deflectors are used which have a total area FZ (one plane) projected in the Z direction, corresponding to something like 50% of the cross-sectional area F. As FIG. 6a shows, the deflectors of FIG. 5 can be produced very simply, cheaply and without scrap from metal strip by stamping and bending. The deflectors 30, 39 are bent alternately to opposite sides, the residual strip 21 serving as mounting 20. Similarly, the deflector arrangement of FIG. 2 can be produced by trapezoidal toothed stampings from a metal strip to give two rows of deflectors 30, 31 with mountings 20 from a single metal strip.

Figure 7:
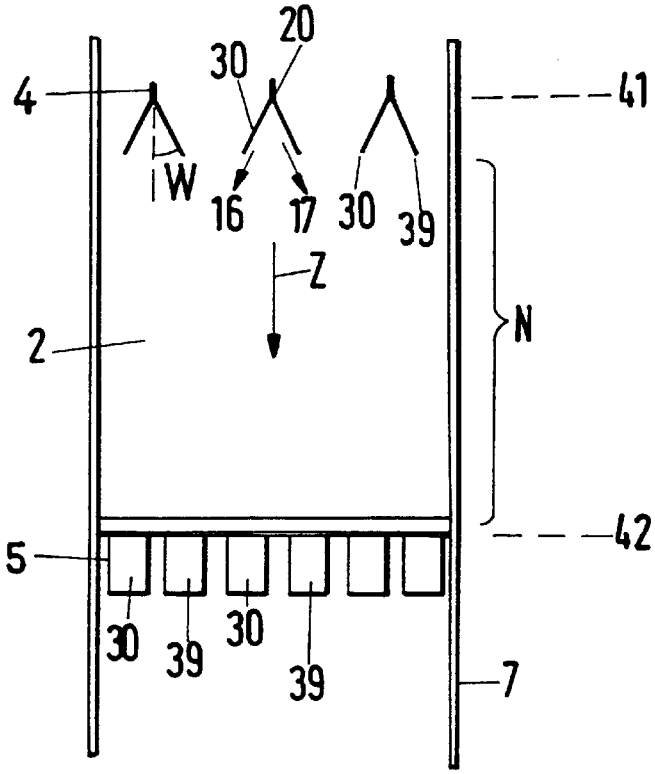
FIG. 7 shows a mixer arrangement comprising two mixing elements and an aftermixing path.

FIG. 7 shows a mixer arrangement having two mixing elements 3, 4, at least the first mixing element 3 being followed by an aftermixing path N facilitating enhanced cross-mixing by the turbulent crossing subflows produced in the mixing element. In this embodiment the elements 3, 4 are turned away from one another by 90°.

Figure 8A:
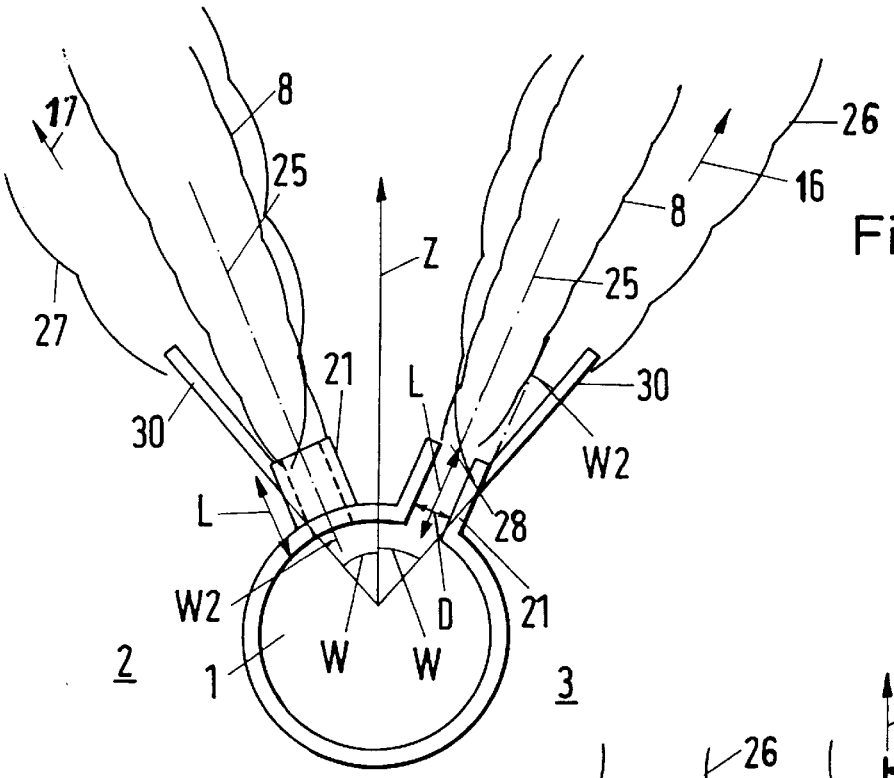
FIGS. 8a and 8b are two views showing a mixing device according to the invention having two dispensing tubes as mountings and two deflectors.
Figure 8B:
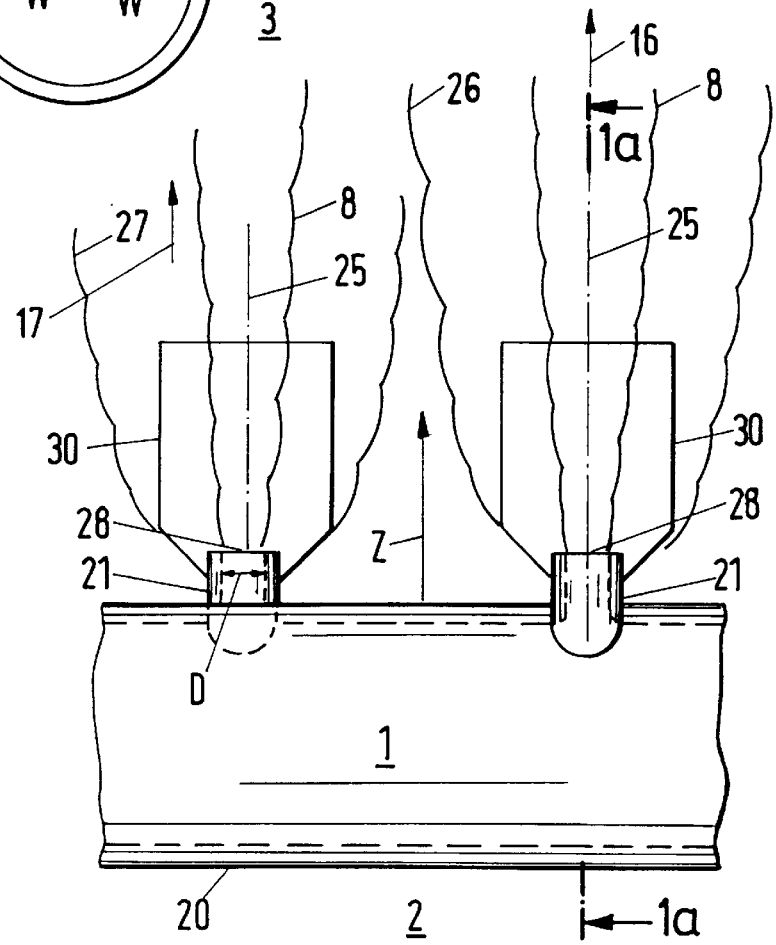

The arrangement shown in FIGS. 8a and 8b comprises a mixing device having two dispensing tubes 21 on a main tube 20 as mountings, one deflector 30 each being disposed at the dispensing tube outlet orifices 28 at an acute angle W to the main flow direction Z. The length L of the dispensing tubes 21 is at least equal to their diameter D. The deflectors 30 include an angle W2 of from 0° to 45° with the tube axis and are oriented oppositely to one another relatively to Z. The deflectors 30 produce deflected turbulent cones 26, 27 of the main fluid 2, such cones crossing the injected cones 8 of the admixed fluid 1 and thus being subject to intensive mixing. The two deflectors 30 and the dispensing tubes E1 are oriented in opposite directions relatively to Z and are staggered relatively to one another along the main tube 20. Crossing subflows 16, 17 are therefore produced, leading to intensive mixing and homegenization of the two fluids 1, a over the main channel cross-section.

Figure 9A:
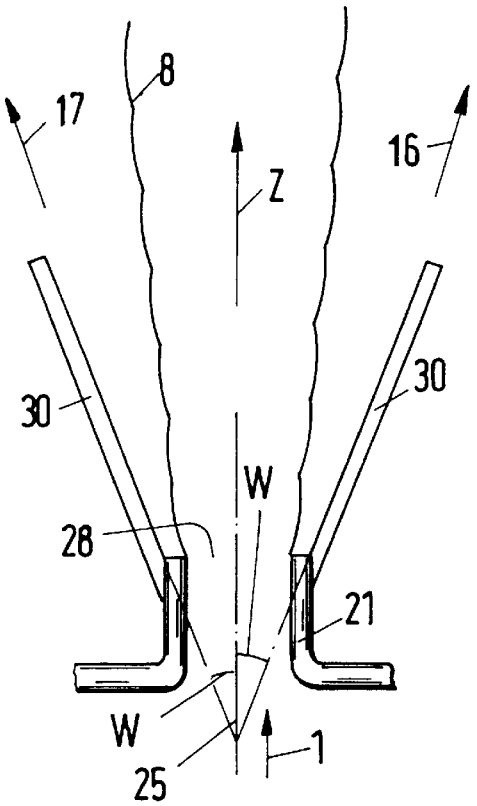
FIGS. 9a and 9b show another example comprising a dispensing tube and two deflectors.
Figure 9B:
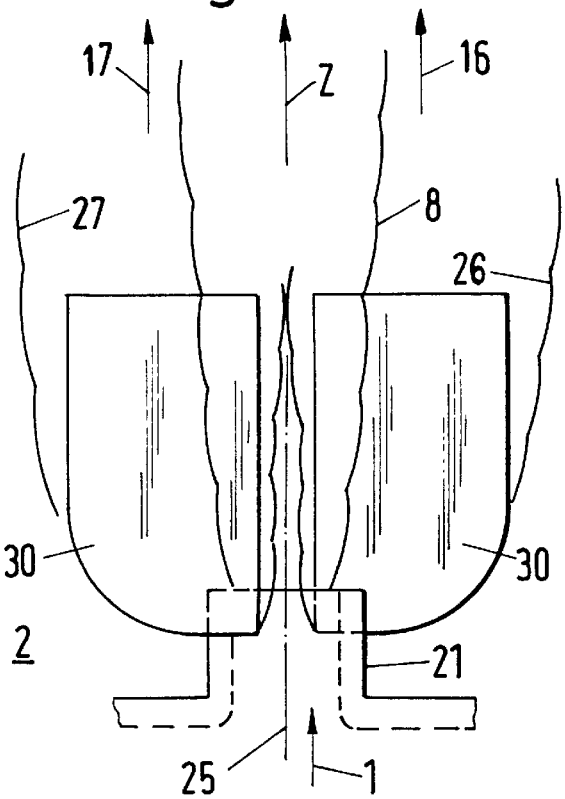

FIGS. 9a and 9b show and example having only a single dispensing tube E1 which extends parallel to the main flow direction Z, two deflectors 30 being disposed at the dispensing tube outlet orifice 28. The deflectors are oriented in opposite directions to one another and are offset from one another in order to produce crossing subflows 16, 17.

Figure 10:
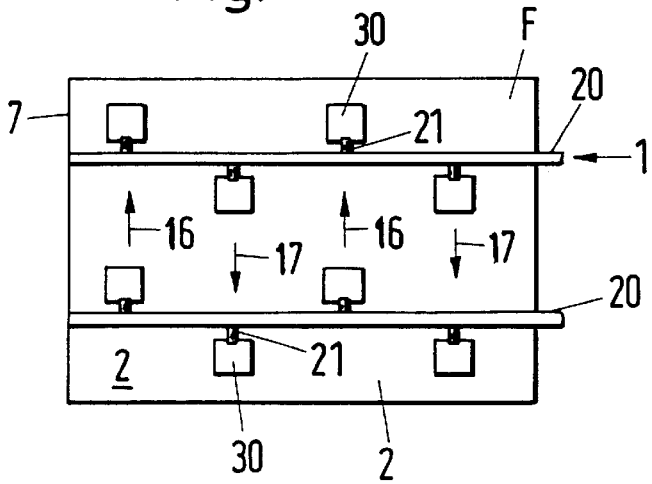
FIG. 10 shows an example having a number of dispensing tubes and deflectors.
Figure 11A:
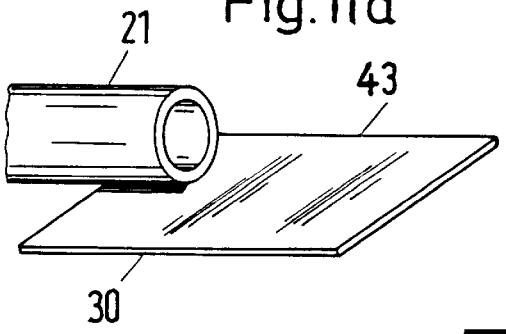
FIGS. 11a, 11b, 11c and 11d show various examples of deflectors in dispensing tubes.
Figure 11B:
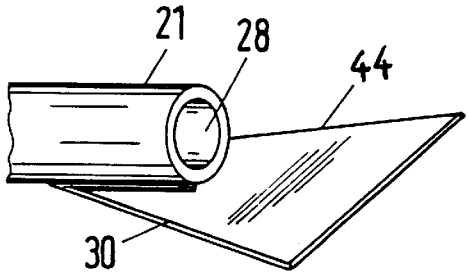
Figure 11C:
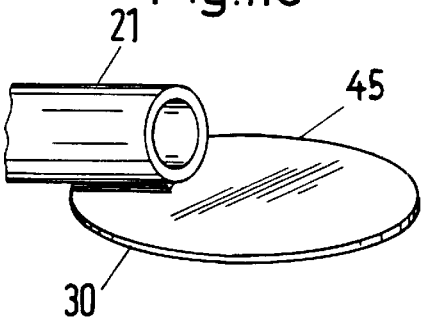
Figure 11D:
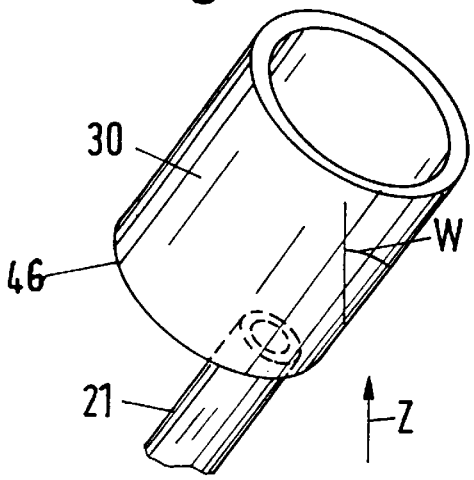

FIG. 10 shows another injection device having a number of dispensing tubes 21 and deflectors 30 on two main tubes 20 as mountings, the deflectors 30 being distributed uniformly over the whole channel cross-section F. The main flow is therefore broken up uniformly by the offset and oppositely directed deflectors into crossing subflows whose directions 16, 17 extend alternately upwardly and downwardly. To maximize the production of crossing subflows the deflectors 30 can be relatively large, their total area FZ which is projected in the Z direction preferably being between 5% and 50% of the area F. Very good mixing with a very reduced pressure drop is often achieved with an area ratio of from 10% to 15%.

FIGS. 11a to 11d show various examples of appropriate forms of deflectors on the dispensing tubes —rectangular 43, triangular 44, round 45 or curved as a tubular element 46.

Figure 12:
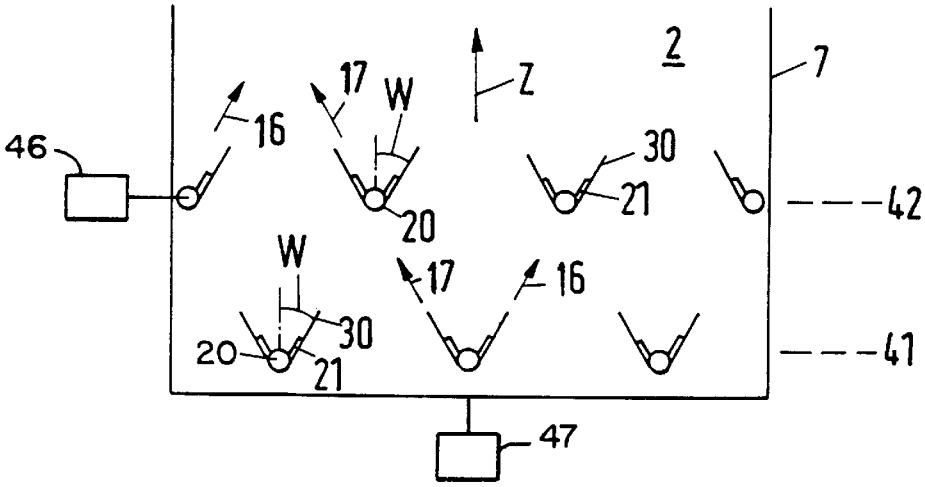
FIG. 12 shows a mixing device having dispensing tubes and deflectors in two planes.

FIG. 12 shows an arrangement having dispensing tubes 21 as mountings and deflectors 30 in two planes 41, 42, the dispensing tubes with deflectors of the second plane being staggered relatively to those of the first plane. The direction of the dispensing tubes having deflectors W in the second plane can be turned relatively to the direction in the first plane, preferably by 90°. The invention may also be used to admix ammonia from a source of ammonia 46 with a flue gas flow from a source of flue gas 47. In a test example using mixing elements according to the invention in the form of deflectors on the dispensing tubes, mixing efficiency could be improved from 4% to just 2% concentration variation.

We claim:

1. A static mixing element in a flow channel, comprising:

a flow channel having a channel cross-sectional area and a channel wall defining a main flow direction;

an injection system including at least one directed dispensing tube for injecting another [liquid] *fluid* into the flow channel, the at least one directed dispensing tube including an outlet orifice having a tube axis; and at least two deflectors each being attached to a mounting at a distance from the channel wall, the at least two deflectors forming an angle of between 10° to 45° relative to the main flow direction, a projection of the at least two deflectors in the main flow direction being 5% to 50% of the channel cross-sectional area;

the at least one dispensing tube being said mounting for at least one of the at least two deflections, the at least one of the at least two deflectors being disposed at the outlet orifice of the dispensing tube.

2. A static mixing element in a flow channel of claim 1, wherein:

the at least one of the at least two deflectors forms-an angle of between 0° to 45° with the tube axis.

3. A device according to claim 1, wherein: the dispensing tube has a length and an internal diameter, the length being at least equal to the internal diameter.

4. A device according to claim 1, wherein:

the dispensing tube has an outlet cross-sectional area; and each of the at least two deflectors are at least ten times as large as the outlet cross-sectional area of the dispensing tube.

5. A device according to claim 1, wherein: the at least one of the at least two deflectors forms an angle between 0° and 15° with the tube axis.

6. A device according to claim 1, further comprising: a source of ammonia fluidly coupled to the injection system; and a source of flue gas fluidly coupled to the flow channel.

7. A static mixing element in a flow channel according to claim 1, wherein:

the injection system comprises a pipe positioned within the flow channel.

8. A static mixing element in a flow channel according to claim 1, wherein:

two of the at least two deflectors are mounted to the outlet orifice.

9. A static mixing element in a flow channel according to claim 1, wherein:

the at least two deflectors are positioned on opposing sides of the injection system relative to the main flow direction.

10. A static mixing element in a flow channel according to claim 1, wherein:

the at least two deflectors comprise a cylindrical shape.

11. A static mixing arrangement, comprising:

a flow channel having a channel cross-sectional area and a channel wall defining a main flow direction;

a plurality of mountings positioned in the flow channel and extending in the main flow direction;

a plurality of cylindrical deflectors mounted to the plurality of mountings, the plurality of deflectors having an axis forming an angle of between 10° to 45° to the main flow direction, wherein each of the plurality of mountings have a group of the plurality of deflectors mounted thereon the deflectors on each mounting being staggered so that adjacent deflectors are oriented in opposing directions relative to the main flow direction.

12. A static mixing arrangement according to claims 11, wherein:

the plurality of deflectors have a projection of surfaces normal to the main flow direction, the projection of surfaces consuming between 5% and 50% of the channel cross-sectional area.

13. A static mixing arrangement according to claim 11, wherein:

the plurality of mountings lie in a plane.

* * * * *